United States Patent [19]

Westhoff et al.

[11] 4,139,087
[45] Feb. 13, 1979

[54] SHIFTABLE CONVEYOR

[75] Inventors: James R. Westhoff, Phoenix; Harry H. Waight, Scottsdale; John J. Glancy, Phoenix, all of Ariz.

[73] Assignee: Marathon Steel Company, Phoenix, Ariz.

[21] Appl. No.: 787,451

[22] Filed: Apr. 13, 1977

[51] Int. Cl.² .............................................. B65G 41/00
[52] U.S. Cl. ................................... 198/309; 198/735; 198/862; 198/864
[58] Field of Search ............... 198/300, 303, 309, 735, 198/808, 827, 830, 860–862, 864; 299/18, 43–45, 64–67

[56] References Cited

U.S. PATENT DOCUMENTS

| 2,873,022 | 2/1959 | Murphy | 198/808 |
| 3,612,257 | 10/1971 | Goergen et al. | 198/864 |

FOREIGN PATENT DOCUMENTS

| 952697 | 11/1956 | Fed. Rep. of Germany | 198/830 |
| 1209492 | 1/1966 | Fed. Rep. of Germany | 198/860 |
| 1063627 | 5/1954 | France | 198/830 |
| 261973 | 5/1970 | U.S.S.R. | 198/860 |

Primary Examiner—Joseph E. Valenza
Attorney, Agent, or Firm—Cahill, Sutton & Thomas

[57] ABSTRACT

A shiftable conveyor system for use in mining operations includes a conveyor having a conveyor belt and a longitudinal and a lateral axis. A vehicle for shifting the conveyor system in a lateral direction includes an arm for engaging the conveyor and for applying lateral shifting forces to the conveyor. The conveyor system includes a series of skids spaced along the longitudinal axis of the conveyor and aligned parallel with the lateral axis of the conveyor. A pair of side rails are positioned on opposing ends of the series of spaced apart skids. The side rails are pivotally connected to the skids to maintain a predetermined spacing therebetween. The side rails also receive the lateral forces from the arm of the vehicle and translate the shifting forces exerted by the arm into lateral movement of the skids. A plurality of rigid conveyor modules are positioned between the side rails and above the skids to support the conveyor belt. Coupling is provided between each of the conveyor modules and an associated pair of skids to permit lateral displacement of these skids as the arm on the vehicle transmits the shifting forces to one of the side rails.

9 Claims, 8 Drawing Figures

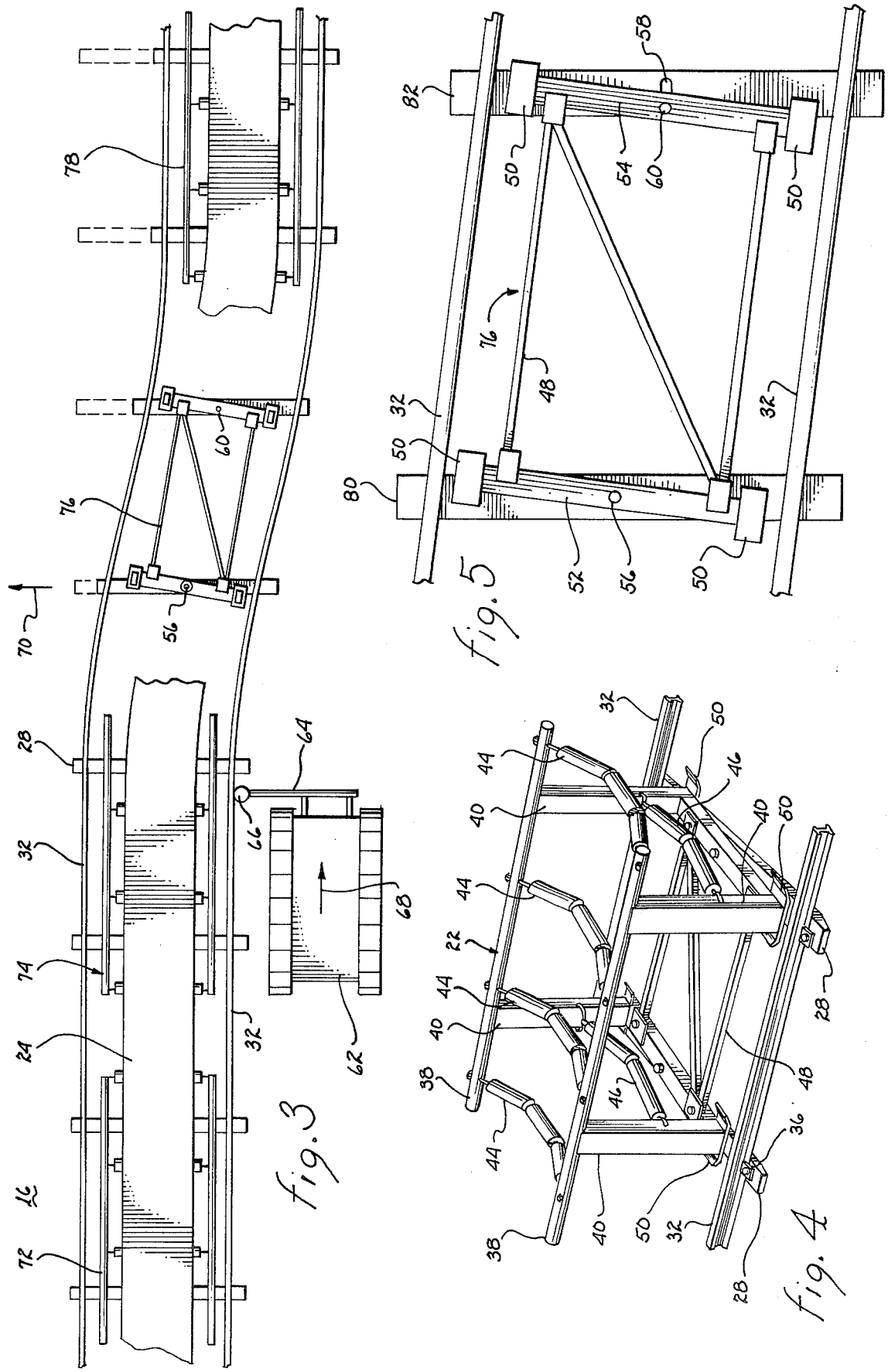

SHIFTABLE CONVEYOR

BACKGROUND OF THE INVENTION

1. Field of the Invention

This invention relates to conveyor systems, and more particularly, to shiftable conveyor systems which can be laterally displaced substantial distances.

2. Description of the Prior Art

In strip mining operations, overburden is first removed from an underlying deposit of the desired material. For discussion purposes, it will be assumed that the desired material is coal. After overburden removal, the coal is mined in tiers which are joined by an advancing vertical wall of coal. The mined coal must be conveyed out of the mining site to an accessible location from which the coal can be transported to the point of sale or to a processing plant.

Standard strip mining procedure involves the use of an electrically powered drag line or shovel which removes large volumes of coal from the vertically oriented coal face. The drag line deposits the mined coal onto a system of conveyor belts which transport the coal to storage or transportation sites adjacent to the strip mine.

As the mining operation progresses, the drag line removes substantial portions of the coal face requiring advancement of the mining equipment in the direction of the receding coal face. Typically, after a one hundred foot strip has been removed from the coal face, the conveyor system must be repositioned to be adjacent the mining equipment and drag line. This relocation of the conveyor system usually takes eight hours and requires that all mining operations be temporarily suspended.

The shift rates for conveyor systems of the type currently in use in strip mining operations are normally stated in terms of square feet per hour. This unit of measure defines the area covered during lateral movement of the conveyor during a one-hour period of continuous transposition. The maximum shift rate typically characterizing prior art conveyor systems is on the order of twenty-five thousand square feet per hour. For a typical one-half mile long conveyor system, an eighty foot lateral shift will cover 211,200 square feet. Since the fastest prior art shiftable conveyor systems can shift twenty-five thousand square feet per hour, a shift of 211,200 square feet would take approximately eight hours and twenty minutes. During this period of time the extraordinarily expensive drag line must be shut down since there is no means for conveying the coal which it removes from the coal face to a point outside the mine. All equipment for transporting the coal from the strip mine to the point of sale is unable to function unless the drag line and its associated conveyor equipment are duplicated at some other point in the mine. Additionally, during the time required to shift the conveyor system into a new operating position, salaried employees are underutilized. Since the times at which the conveyor system must be shifted depend on the rate at which the coal face is mined, operating personnel often cannot be scheduled to be off duty during these time consuming conveyor shifting operations.

While it is possible to shift prior art conveyor systems more frequently for distances of up to ten to twenty feet at a time, the cumulative down time for a given amount of lateral displacement remains the same because the shifting rate of the conveyor system cannot be increased by accomplishing shifts in smaller increments.

Since various elements of a conveyor system are deformed during a shift, prior art shiftable conveyor systems must be realigned following each shift. For this reason, a shorter shift distance is less practical since each shift requires a separate time consuming realignment step.

An additional negative aspect of prior art shiftable conveyor system relates to profits from coal sales lost as a result of the conveyor down time. A down time of approximately eight hours results in a loss of approximately 24,000 tons of coal production.

By reducing the down time of a shiftable conveyor system, the overhead costs associated with strip mining are reduced and the profits resulting from the sale of coal are increased: overhead utilization is increased and larger amounts of coal are mined during a fixed time interval.

Various systems have been suggested in the past to facilitate the lateral movement of a conveyor. U.S. Pat. No. 3,612,257 (Goergen) discloses a shiftable conveyor system which permits the belt of the conveyor system to be laterally shifted up to several feet. A plurality of wheels are provided to allow the conveyor system to be longitudinally displaced substantial distances. The ability of this conveyor system to be laterally displaced apparently is directed toward providing conveyor belt alignment upon completion of a large longitudinal displacement of the conveyor system by towing.

U.S. Pat. No. 3,796,296 (Bakker) and U.S. Pat. No. 2,722,306 (Cartlidge) disclose articulated segments of a conveyor system for allowing the conveyor system to operate in other than a linear manner. No means for laterally displacing the conveyor system is disclosed.

German Pat. No. 507,904 discloses a conveyor system having laterally shiftable elements to provide for non-linear operation of the conveyor system. This conveyor system is not designed to be laterally displaced along its entire length for substantial distances.

OBJECTS OF THE INVENTION

It is therefore a primary object of the present invention to provide a shiftable conveyor system having a lateral shift rate capable of exceeding 100,000 square feet per hour.

Another object of the present invention is to provide a shiftable conveyor system which can reduce by seventy-five percent the down time on strip mining machinery resulting from cessation of mining operations during conveyor shifts.

Yet another object of the present invention is to provide a shiftable conveyor system which utilizes a standard tracked vehicle having a laterally extending side boom for accomplishing the lateral displacement of the shiftable conveyor system.

Still another object of the present invention is to provide a shiftable conveyor system including a plurality of rigid conveyor modules which require only limited realignment upon the completion of a shifting operation.

Yet another object of the present invention is to provide a shiftable conveyor system which incorporates simplified mechanical elements requiring limited maintenance.

SUMMARY OF THE INVENTION

Briefly stated, and in accord with one embodiment of the invention, a shiftable conveyor system includes a conveyor having a conveyor belt and a longitudinal and a lateral axis.

A vehicle which shifts the conveyor system in a lateral direction includes an arm for engaging the conveyor and for applying shifting forces to the conveyor.

The conveyor system includes a series of skids spaced along the longitudinal axis of the conveyor and generally aligned with the lateral axis of the conveyor. Rail means are pivotally connected to the skids for maintaining the skids in a predetermined spacial relationship and for receiving the forces from the arm on the vehicle and translating the shifting forces exerted by the arm into lateral movement of the skids.

A plurality of rigid frames support the conveyor belt and connecting means couples the rigid frames to sequential pairs of the skids while permitting relative differential lateral displacement of adjacent skids as the arm on the vehicle transmits the shifting forces to the rail means.

DESCRIPTION OF THE DRAWING

The invention is pointed out with particularity in the appended claims. However, other objects and advantages, together with the operation of the invention, may be better understood by reference to the following detailed description taken in connection with the following illustrations wherein:

FIG. 3 is a plan view of the shiftable conveyor system showing an element thereof being laterally displaced by a tracked vehicle.

VIG. 4 is a perspective view of a single element of the shiftable conveyor system.

FIG. 5 is a plan view of a portion of an element of the shiftable conveyor system, particularly illustrating the relative displacement between a rigid conveyor module, the side rails and the skids.

Figure 6:
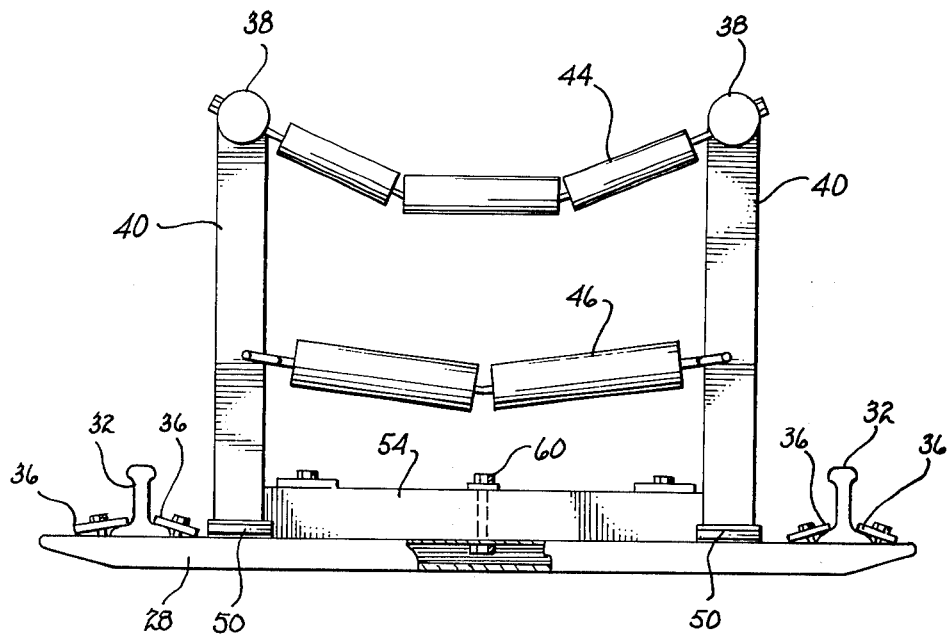

FIG. 6 is a front view of the single element of the shiftable conveyor system shown in FIG. 4.

Figure 7:
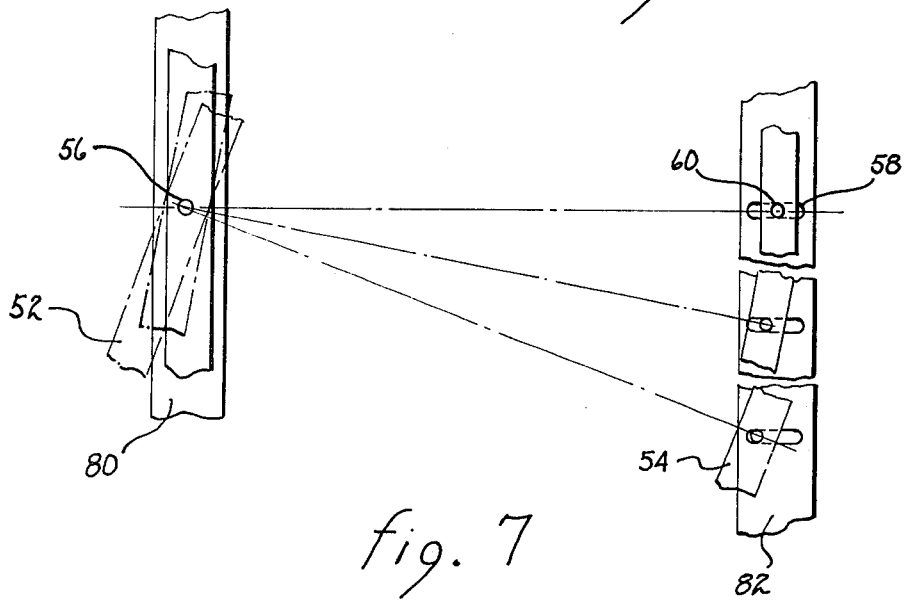

FIG. 7 is a schematic representation of the relative displacement between a rigid conveyor module and the skids of the shiftable conveyor system during lateral shifting of the conveyor.

Figure 8:

FIG. 8 is an alternative configuration of the pin and slot combination which allows relative displacement between the rigid conveyor module and selected skids.

DESCRIPTION OF THE PREFERRED EMBODIMENT

In order to better illustrate the advantages of the invention and its contributions to the art, a preferred hardware embodiment of the invention will now be described in some detail.

Figure 1:
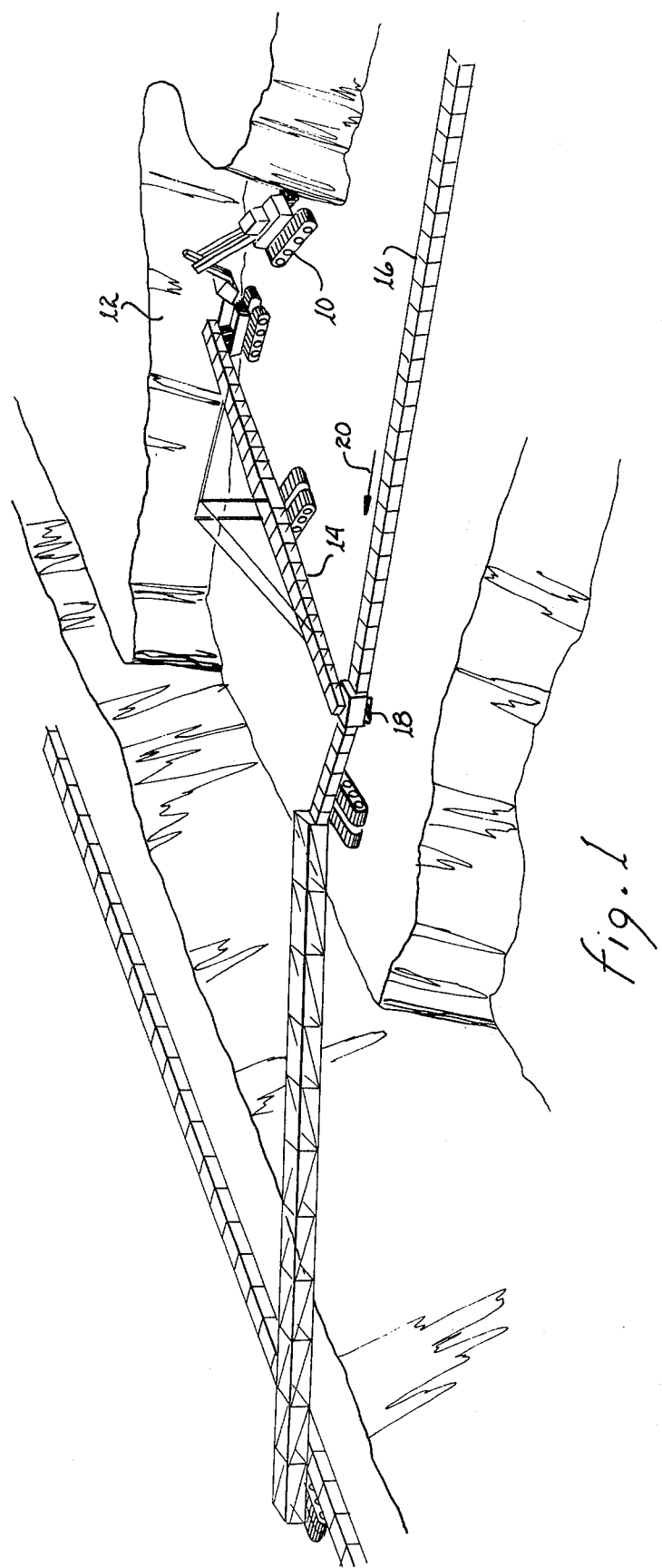
FIG. 1 is a perspective view of a coal strip mining operation.

Referring to FIG. 1, a strip mine is shown in which a drag line 10 is removing coal from coal face 12. A transfer conveyor 14 is shown disposed between drag line 10 and shiftable conveyor 16 for transferring coal therebetween. A funnel-like apparatus 18 helps to direct the flow of coal from conveyor 14 onto the belt of conveyor 16. Various other conveyor systems (not numbered) are shown which assist in transferring the coal from shiftable conveyor 16 to points outside the strip mine.

In FIG. 1 drag line 10 and conveyor 14 are shown in a position shortly after shiftable conveyor 16 has been repositioned. As the mining operation progresses, drag line 10 will continue its movement to the right-hand side of FIG. 1. After traversing the one-half mile or more length of conveyor 16, the length of conveyor 14 will be insufficient to bridge the gap between the region in which drag line 10 is operating and the position of shiftable conveyor 16. At that point, it will be necessary to reposition shiftable conveyor 16 to a point closer to the relocated coal face 12. Arrow 20 indicates the direction of movement of the upper belt of conveyor 16.

Figure 2:
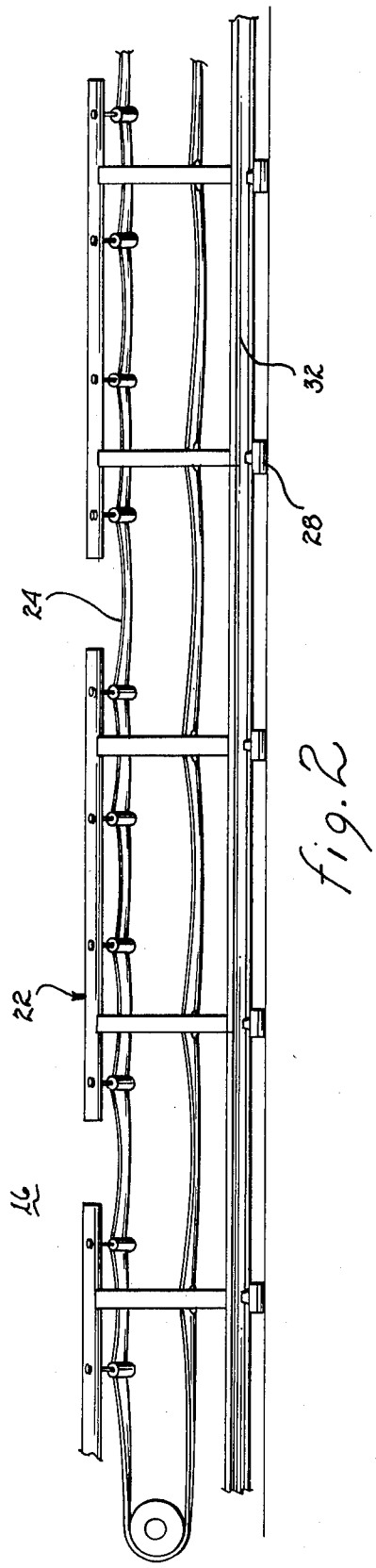
FIG. 2 is an elevational view of a section of the shiftable conveyor system of the present invention.

Referring now to FIG. 2, shiftable conveyor 16 is fabricated from a plurality of rigid conveyor modules or frames, such as rigid frame 22, which support conveyor belt 24.

Referring now to FIGS. 4 and 5, a series of skids 28 are oriented in a direction perpendicular to the longitudinal axis of conveyor 16. Rail means or side rails 32 are pivotally connected to the end portions of each skid by pivotal connectors 36. Each of the side rails is laterally deformable, but is not deformable in length. The side rails are continuous in length and are typically manufactured from railroad rails laid end to end and bolted together with splice bars.

Each rigid frame 22 includes horizontally oriented bars 38 which are positioned above and attached to vertically oriented support beams 40. Four three-element conveyor guides 44 are secured between bars 38 to support and guide the belt of conveyor 16. In a similar manner, a pair of two element conveyor guides 46 are oriented at a level lower than guides 44 to support the unloaded returning conveyor belt.

Rigid frame 22 further includes a rectangular shaped base 48 which prevents relative movement among the various elements of rigid frame 22. Bearing surfaces 50 include upward turned ends to facilitate relative lateral and rotational movement between the upper surface of skids 28 and the lower surface of base 48.

In FIG. 5 a bearing 50 is coupled to each end of end piece 52 and 54 which are positioned directly above skids 80 and 82. End piece 52 and the upper surface of skid 80 are pivotally coupled together via a pin 56. This coupling between end section 52 and skid 80 permits solely rotational movement between skid 80 and end section 52.

Both relative rotational motion and relative lateral displacement are permitted between end section 54 and skid 82 by the combination of slot-like aperture 58 and pin 60. Skid 82 is typically fabricated from steel and has a hollow interior. Aperture 58 is disposed in the upper surface of skid 82 and the lower surface of pin 60 extends through aperture 58 and relative vertical motion between end piece 54 and skid 82 is prevented by attachment of a nut to the lower threaded portion of pin 60 (See FIG. 6).

The manner of operation of shiftable conveyor 16 will now be described in some detail. Referring to FIG. 3, a tracked vehicle 62 includes a laterally extending arm 64 which includes a roller 66 on the end thereof. Arrow 68 indicates the direction of movement of vehicle 62.

The arm 64 on vehicle 62 exerts a lateral force against a rail 32 of conveyor 16. Arrow 70 indicates the direction of displacement of conveyor 16. Modules 72 and 74 have completed their lateral displacement, while module 76 is in the process of transitioning from a first lateral position to a second lateral position. Module 78 has not yet been displaced laterally. The dotted lines extending from rails 28 indicate the final desired resting position of modules 76 and 78.

The lateral displacement of conveyor 16 imparted by vehicle 62 causes skids 28 to be displaced in a direction substantially parallel with each other. While arms 64 and wheels 66 do impart a small longitudinal force vector to side rails 32, the resistance between the ground and the lengthwise edge of skids 28 minimizes the longitudinal displacement of skids 28 or conveyor 16. The path of least resistance of skids 28 lies along their lengthwise axis, thus causing lateral displacement rather than longitudinal of conveyor 16 by arm 64.

Referring now to FIGS. 3 and 7, vehicle 62 has caused side rails 32 to be distorted into an S-shaped curve in the vicinity of module 76. Because of the inability of rails 32 to yield in a lengthwise direction, the distance between the upper and lower ends of skids 80 and 82 remains constant. As was discussed immediately above, the force imparted by vehicle 62 to skids 80 and 82 causes them to be displaced laterally. Skids 80 and 82 do not rotate and their displacement maintains them in an orientation where they remain parallel to one another. Thus, skids 80 and 82 and the length of the side rails connecting their respective ends form a parallelogram. The relative displacement between skids 80 and 82 causes the longitudinal spacing between these two skids to be somewhat decreased in a manner identical to that which can be seen from collapsing a parallelogram.

On the other hand, the base 48 of module 76 is a rigid rectangle. Pin 56 permits only relative rotational movement between end piece 52 and the upper surface of skid 80 so that rigid module 76 will be caused to rotate about the arc of a circle as side rails 32 assume an S-shape configuration. To accommodate the different rate of displacement between pin 60 and the upper surface of rail 82, a slot-like aperture 58 has been provided. FIG. 7 shows how with increased displacement of the side rails by arm 64 the relative position of pins 60 within aperture 58 changes.

For small relative angular displacements between module 76 and the two skids to which it is coupled, an oval-shaped aperture of the type shown in FIG. 7 is adequate. However, for greater displacements, aperture 58 must have a somewhat different cross-section more of the type shown in FIG. 8 to accommodate the relative longitudinal displacement resulting from the movement of the parallelogram formed by side rails 32 and skids 80 and 82 and the rotation of module 76 about the radius of a circle.

In order to shift the shiftable conveyor a substantial distance, vehicle 62 makes repeated passes down side rails 32. Depending on the size of the particular conveyor embodiment, the displacement possible as a result of one pass of vehicle 62 down the length of conveyor 16 can vary from several feet to perhaps as much as 8 to 10 feet.

In addition to the positioning of wheel 66 shown in FIG. 3, it is also possible to reverse the direction of travel of vehicle 62 and to couple wheel 66 to the inner surface of a side rail to pull the conveyor system 16 in a lateral direction. Upon completion of the desired displacement, alignment of the various elements of conveyor 16 will not be required since the rigid modules 22 cannot be deformed. Conveyor guides 44 and 46 are maintained in a constant position as a result of the rigid fabrication technique utilized in constructing modules 22.

As a result of this design, a length of conveyor 16 one-half mile long can be laterally shifted eighty feet in two hours time. Prior art systems required in excess of eight hours. Large excursions are made possible by this system as a result of the flexibility of the side rails 32 and as a result of the combination of the connecting means including pin 56 and 60 and aperture 58 which eliminate stresses which would otherwise be present as a result of the relatively substantial lateral excursions accomplished during a single pass by vehicle 62. The connecting means not only couples the rigid frames to sequential pairs of the skids, but also permits relative differential lateral displacement of adjacent skids as the arm on the vehicle transmits the shifting forces to the rail means.

It will be apparent to those skilled in the art that the disclosed shiftable conveyor system may be modified in numerous other ways and may assume many other embodiments other than the preferred form specifically set out and described above. In particular, it will be noted that the means for initially removing material has been indicated as a power shovel in FIG. 1 and has been generically referred to as a drag line 10 in the specification. Similar modifications and variations in terminology will be obvious to those skilled in the art. Accordingly, it is intended by the appended claims to cover all such modifications of the invention which fall within the true spirit and scope of the invention.

What is claimed is:

1. In a shiftable conveyor system including:
   (a) a conveyor having a conveyor belt and a longitudinal and a lateral axis; and
   (b) a vehicle for shifting the conveyor in a lateral direction, said vehicle including an arm for engaging said conveyor and applying lateral shifting forces to said conveyor;

said conveyor comprising in combination:
   (a) a series of skids spaced along the longitudinal axis of said conveyor and generally aligned with the lateral axis of said conveyor;
   (b) rail means connected to said skids by means which permit
      i. maintaining said skids in a predetermined spatial relationship, and
      ii. receiving the forces from the arm on said vehicle and translating the shifting forces exerted by the arm into lateral movement of said skids;
   (c) a plurality of frames for supporting said conveyor belt, said frames being spaced along the longitudinal axis of said conveyor belt;
   (d) structural means rigidly interconnecting independent sequential pairs of said frames; and
   (e) connecting means for coupling each rigidly interconnected pair of frames to an adjacent pair of said skids to permit relative displacement between each adjacent pair of skids and the corresponding pair of rigidly interconnected frames as the arm on said vehicle transmits the shifting forces to said rail means.

2. The conveyor according to claim 1 wherein said rail means includes a pair of longitidinally oriented side rails.

3. The conveyor according to claim 2 wherein said rail means further includes pivotal connector means for connecting said side rails to said skids.

4. The conveyor according to claim 1 wherein each of said rigid frames includes a first and a second end and wherein said connecting means includes pivot means for pivotally attaching the first end of each rigid frame to one of said adjacent skids and coupling means for permitting simultaneous longitudinal and rotational movement between the second end of each rigid frame and the other of said adjacent skids.

5. The conveyor according to claim 4 wherein the first end of each of said rigid frames includes a central portion and wherein the upper portion of said one adjacent skid includes a first aperture and wherein said pivot means includes a pin extending downwardly from said central portion of the first end through the first aperture.

6. The conveyor according to claim 5 wherein the second end of each of said rigid frames includes a central portion having a second aperture therein and wherein said coupling means includes a pin extending downwardly from the central portion of the second end into the second aperture.

7. The conveyor according to claim 6 wherein said first aperture is round.

8. The conveyor according to claim 6 wherein said second aperture is a slot.

9. The conveyor according to claim 6 wherein said side rails include railroad rails.

* * * * *